United States Patent
Huang et al.

(10) Patent No.: US 11,005,366 B2
(45) Date of Patent: May 11, 2021

(54) MIXED POWER CONVERTER INCLUDING SWITCHED-CAPACITOR CONVERSION CIRCUIT AND INDUCTOR BUCK CIRCUIT

(71) Applicant: Nuvoton Technology Corporation, Hsinchu (TW)

(72) Inventors: Po-Hsun Huang, Tainan (TW); Chung-Ming Hsieh, Jhubei (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 16/595,951

(22) Filed: Oct. 8, 2019

(65) Prior Publication Data
US 2020/0204071 A1    Jun. 25, 2020

(30) Foreign Application Priority Data
Dec. 22, 2018 (TW) .................... 107146581

(51) Int. Cl.
| | | |
|---|---|---|
| *H02M 3/07* | (2006.01) | |
| *H02M 3/155* | (2006.01) | |
| *H02M 3/156* | (2006.01) | |
| *H02M 3/157* | (2006.01) | |
| *H02M 3/158* | (2006.01) | |
| *H02M 1/42* | (2007.01) | |

(52) U.S. Cl.
CPC ............. *H02M 3/157* (2013.01); *H02M 3/07* (2013.01); *H02M 3/158* (2013.01); *H02M 2001/4291* (2013.01)

(58) Field of Classification Search
CPC .. H02M 3/07; H02M 3/073; H02M 2003/075; H02M 2003/076; H02M 3/155–1588
See application file for complete search history.

(56) References Cited

U.S. PATENT DOCUMENTS

| | | | |
|---|---|---|---|
| 8,723,491 B2 | 5/2014 | Giuliano | |
| 9,143,037 B2* | 9/2015 | Giuliano | ................... G05F 1/10 |
| 10,277,209 B2* | 4/2019 | Hsieh | ................. H03K 5/00006 |
| 10,333,392 B2* | 6/2019 | Low | ...................... H02M 3/073 |
| 2009/0278580 A1 | 11/2009 | Kim | |
| 2013/0229841 A1* | 9/2013 | Giuliano | ............. H02M 1/4225 363/60 |
| 2015/0077175 A1* | 3/2015 | Giuliano | ................. H02M 3/07 327/536 |
| 2019/0115830 A1* | 4/2019 | Giuliano | ................. H02M 3/07 |
| 2020/0127557 A1* | 4/2020 | Giuliano | ................. H02M 3/07 |

OTHER PUBLICATIONS

Office Action dated Nov. 25, 2020 in U.S. Appl. No. 16/595,921.

\* cited by examiner

*Primary Examiner* — Thienvu V Tran
*Assistant Examiner* — Sisay G Tiku
(74) *Attorney, Agent, or Firm* — Muncy, Geissler, Olds & Lowe, P.C

(57) ABSTRACT

A power converter includes a switched-capacitor conversion circuit and an inductor buck circuit. The switched-capacitor conversion circuit receives an input voltage, and is operated, according to the first switching frequency, to convert the input voltage into an intermediate voltage. The inductor buck circuit and the switched-capacitor conversion circuit are connected in series. The inductor buck circuit receives the intermediate voltage, and generates an output voltage on a conversion output terminal thereof according to the intermediate voltage. The minimum value of the first switching frequency is determined by the intermediate voltage.

8 Claims, 7 Drawing Sheets

MIXED POWER CONVERTER INCLUDING SWITCHED-CAPACITOR CONVERSION CIRCUIT AND INDUCTOR BUCK CIRCUIT

CROSS-REFERENCE TO RELATED APPLICATION

This application claims the benefit of Taiwan Patent Application No. 107146581, filed on Dec. 22, 2018, in the Taiwan Intellectual Property Office, the disclosure of which is incorporated herein in its entirety by reference.

BACKGROUND OF THE INVENTION

1. Field of the Invention

The present invention relates to a power converter, and more particularly to a mixed power converter.

2. Description of the Related Art

When a conventional buck converter is operated with a higher voltage conversion rate, a higher voltage stress relative to ground is applied on an output terminal of the conventional buck converter, so it is difficult to implement the conventional buck converter having higher efficiency. For this reason, a mixed switched capacitor converter was developed. The mixed switched capacitor converter includes a first stage formed by a switched capacitor converter and a second stage formed by a buck converter. Compared with the conventional buck converter, the mixed switched capacitor converter can have higher efficiency under a higher voltage drop. In conventional mixed switched capacitor converter, the buck converter in the second stage is formed by low voltage devices or components, so the low voltage devices or components of the buck converter may be damaged when a glitch occurs on an output voltage of the switched capacitor converter in the first stage. The glitch on the output voltage of the switched capacitor converter is affected by the operating frequency of the switched capacitor converter, so how to operate the switched capacitor converter with an optimal operating frequency is a key issue in the technical field of the mixed switched capacitor converter.

SUMMARY OF THE INVENTION

An objective of the present invention is to provide a mixed power converter which controls a switching frequency of a switched-capacitor conversion circuit of a first stage according to the input voltage, thereby preventing devices of an inductor buck circuit of a second stage from being damaged.

In order to achieve the objective, the present invention provides a power converter comprising a switched-capacitor conversion circuit and an inductor buck circuit. The switched-capacitor conversion circuit receives an input voltage, and operates according to a first switching frequency, to convert the input voltage into an intermediate voltage. The inductor buck circuit is connected in series to the switched-capacitor conversion circuit, and receives the intermediate voltage and generates an output voltage on a conversion output terminal according to the intermediate voltage. The first switching frequency is higher than a minimal threshold, and the minimal threshold is proportional to the intermediate voltage.

According to an embodiment, the switched-capacitor conversion circuit is operated according to a first switching signal having the first switching frequency, and the inductor buck circuit comprises a high-side switch and an inductor connected in series between the switched-capacitor conversion circuit and the conversion output terminal, and the high-side switch is controlled by a second switching signal having a second switching frequency. The power converter comprises a clock generator configured to receive the first switching signal and generate a clock signal. A frequency of the clock signal is determined by the second switching frequency, and a frequency of the first switching signal is proportional to a frequency of the clock signal.

According to an embodiment, the frequency of the clock signal is proportional to the second switching frequency.

According to an embodiment, the clock generator comprises a frequency detection circuit configured to receive the second switching signal, and detect the second switching frequency of the second switching signal, to generate a detection signal; and a frequency divider circuit configured to receive the detection signal, and generate the clock signal according to the detection signal.

According to an embodiment, the frequency of the clock signal is a half of a frequency of the detection signal.

According to an embodiment, the frequency detection circuit comprises a current source, a first switch, a capacitor, a second switch and a comparator. The current source is configured to provide a charging current. The first switch is coupled between the current source and a first node, and controlled by the second switching signal. The capacitor is coupled between the first node and a second node. A ramp voltage is generated at the first node, and the frequency detection circuit receives the output voltage through the second node. The second switch is coupled between the first node and the second node. The comparator has a positive input coupled to the first node, and a negative input receiving the intermediate voltage, and configured to compare the ramp voltage and the intermediate voltage, to generate the detection signal. A size of the charging current is proportional to the input voltage, and the second switch is controlled by the detection signal.

According to an embodiment, the frequency divider circuit comprises a D-Flip-Flop which has an input terminal, a clock terminal receiving the detection signal, an output terminal generating the clock signal, and an inverting output terminal.

According to an embodiment, the switched-capacitor conversion circuit comprises a plurality of first switches and a plurality of second switches. The plurality of first switches and the plurality of second switches are switched with the first switching frequency, and a turn-on period of the plurality of first switches and a turn-on period of the plurality of second switches do not overlap with each other.

According to an embodiment, the input terminal of the inductor buck circuit receives the intermediate voltage, and the inductor buck circuit comprises an input capacitor, a high-side switch, a low-side switch, an inductor, and an output capacitor. The input capacitor is coupled between the input terminal of the inductor buck circuit and ground. The high-side switch is coupled between the input terminal of the inductor buck circuit and a first node. The low-side switch is coupled between the first node and ground. The inductor is coupled between the first node and the conversion output terminal. The output capacitor is coupled between the conversion output terminal and ground. A turn-on period of the high-side switch and a turn-on period of the low-side switch do not overlap with each other.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
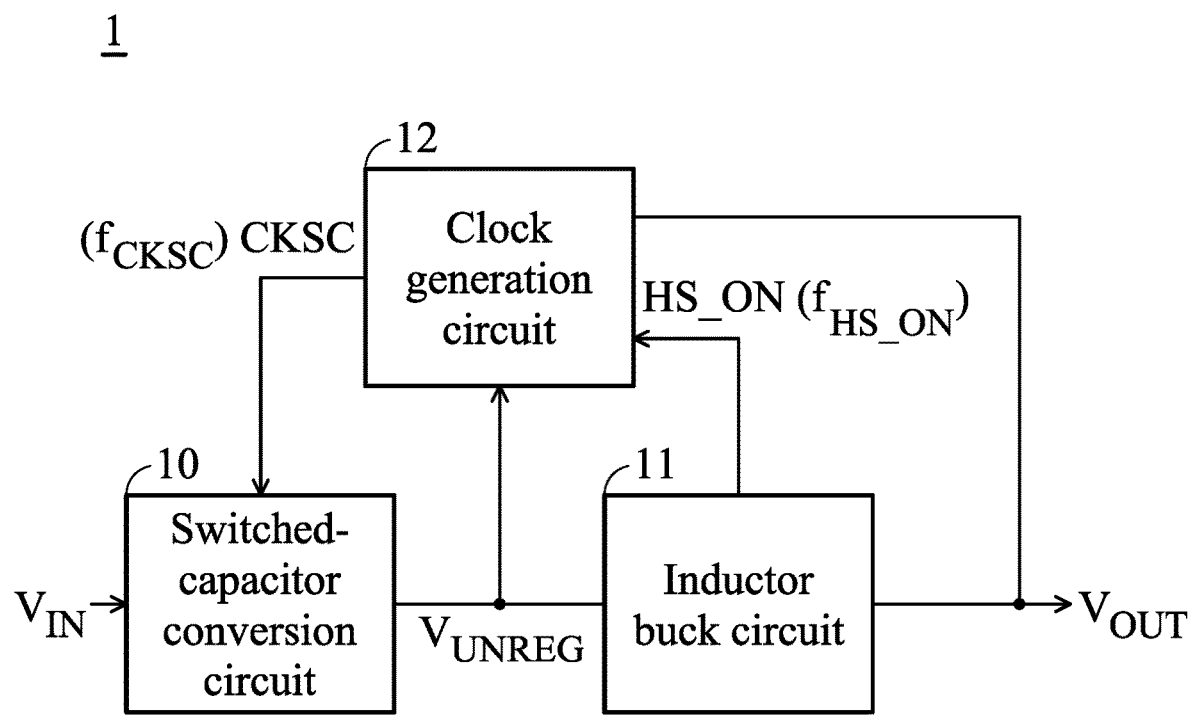
FIG. 1 is a block diagram of a power converter according to an embodiment of the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be acknowledged to imply the inclusion of stated elements but not the exclusion of any other elements.

FIG. 1 is a block diagram of a power converter according to an embodiment of the present invention. Please refer to FIG. 1, a power converter 1 is a mixed power converter which includes a first stage having a switched-capacitor conversion circuit 10, a second stage having an inductor buck circuit 11, and a clock generation circuit 12. The switched-capacitor conversion circuit 10 can receive an input voltage $V_{IN}$, and a clock signal CKSC. The switched-capacitor conversion circuit 10 uses a frequency $f_{CKSC}$ of the clock signal CKSC as an operation frequency thereof, so as to perform a switching operation with an operating frequency $f_{SW\_SC}$, according to the frequency $f_{CKSC}$ of the clock signal CKSC, thereby converting the input voltage $V_{IN}$ into an intermediate voltage $V_{UNREG}$. In this embodiment, the intermediate voltage $V_{UNREG}$ is proportional to the input voltage $V_{IN}$. according to an embodiment, the intermediate voltage $V_{UNREG}$ is approximately equal to a half of the input voltage $V_{IN}$ (that is, $$V_{UNREG} \approx \frac{V_{IN}}{2}).$$

The inductor buck circuit 11 is connected to the switched-capacitor conversion circuit 10 in series, so as to receive the intermediate voltage $V_{UNREG}$. An internal circuit of the inductor buck circuit 11 generates at least one switching signal HS_ON according to a degree of a load. The inductor buck circuit 11 is operated with a frequency $f_{HS\_ON}$ of the switching signal HS_ON, so as to convert the intermediate voltage $V_{UNREG}$ into an output voltage $V_{OUT}$. In this embodiment, the frequency $f_{HS\_ON}$ of the switching signal HS_ON is a switching frequency $f_{SW\_BUCK}$ of the inductor buck circuit 11. The clock generation circuit 12 receives the switching signal HS_ON of the inductor buck circuit 11 and the intermediate voltage $V_{UNREG}$. The clock generation circuit 12 detects the frequency (that is, the switching frequency) $f_{HS\_ON}$ of the switching signal HS_ON, and generate a clock signal CKSC according to the detected frequency $f_{HS\_ON}$. The operating frequency ($f_{CKSC}$) of the switched-capacitor conversion circuit 10 is determined upon the switching frequency $f_{HS\_ON}$ of the inductor buck circuit 11. The circuit architecture and operations of the switched-capacitor conversion circuit 10, the inductor buck circuit 11, and the clock generation circuit 12 are illustrated in detail in following paragraphs.

Figure 2:
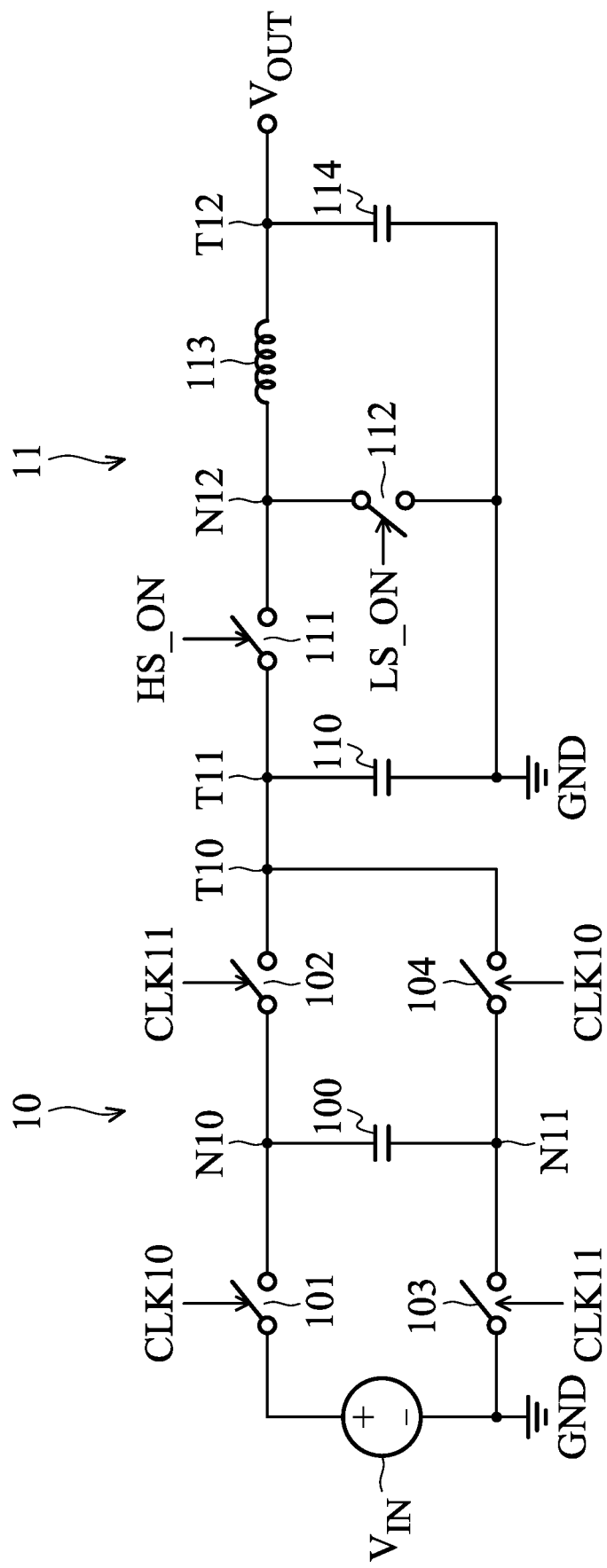
FIG. 2 is a circuit diagram of a switched-capacitor conversion circuit and an inductor buck circuit according to an embodiment of the present invention.

FIG. 2 is a circuit diagram of the switched-capacitor conversion circuit 10 and the inductor buck circuit 11 according to an embodiment of the present invention. Please refer to FIG. 2, the inductor buck circuit 11 is connected to an output terminal T10 of the switched-capacitor conversion circuit 10 in series. The switched-capacitor conversion circuit 10 comprises two switch sets. The switched-capacitor conversion circuit 10 is operated with the operating frequency ($f_{CKSC}$), and controls the two switch sets according to two different switching signals, so that the two switch sets can be turned on alternatively to convert the input voltage $V_{IN}$ into the intermediate voltage $V_{UNREG}$. The circuit architecture and operation of the switched-capacitor conversion circuit 10 are illustrated by an example in the following paragraphs. Please refer to FIG. 2. For example, the switched-capacitor conversion circuit 10 can comprise a capacitor 100 and switches 101 to 104. The switch 101 is coupled between the input voltage $V_{IN}$ and a node N10, the switch 102 is coupled between the node N10 and an output terminal T10, the switch 103 is coupled between ground GND and a node N11, and the switch 104 is coupled between the node N11 and the output terminal T10. The capacitor 100 is coupled between the node N10 and N11. The switches 101 and 104 of the first switch set are controlled by a switching signal CLK10, to switch between turn on and off states. The switches 102 and 103 of the second switch set are controlled by a switching signal CLK11, to switch between the turn on and off states. In this embodiment, the switching signals CLK10 and CLK11 are generated by the internal circuit of the switched-capacitor conversion circuit 10 based on the clock signal CKSC. Based on timing of the switching signals CLK10 and CLK11, turn-on periods of the switches 101 and 104 and turn-on period of the switches 102 and 103 do not overlap with each other. In an embodiment, the switching signals CLK10 and CLK11 have the same frequencies, but phases of the switching signals CLK10 and CLK11 are reverse to each other. As a result, the switches 101 and 104 can be turned on at the same time, and the switches 102 and 103 are turned on at the same time, but the switches 101 and 104 are not turned on during the period in which the switch 102 and 103 are turned on. According to the embodiment of the present invention, the frequency of the switching signals CLK10 and CLK11 is the switching frequency $f_{SW\_SC}$ of the switches 101 to 104, and is proportional to the frequency $f_{CKSC}$ of the clock signal CKSC (that is, the operation frequency of the switched-capacitor conversion circuit 10). For example, the frequency of the switching signals CLK10 and CLK11 is equal to the operating frequency ($f_{CKSC}$) of the switched-capacitor conversion circuit 10, that is, the switching frequency $f_{SW\_SC}$ of the switches 101 to 104 is equal to the operating frequency ($f_{CKSC}$) of the switched-capacitor conversion circuit 10. In this example, the internal circuit directly, which generates the switching signals CLK10 and CLK11, of the switched-capacitor conversion circuit 10 can output the clock signal CKSC as one of the switching signals CLK10 and CLK11, and the clock signal CKSC can be inverted and then the inverted clock signal CKSC is outputted as the other of the switching signals CLK10 and CLK11. In other implementations, the frequency of the switching signals CLK10 and CLK11 is equal to 1/N of the operating frequency ($f_{CSKC}$) of the clock signal CKSC, the switching frequency $f_{SW\_SC}$ of the switches 101 to 104 is equal to 1/N of the operating frequency ($f_{CSKC}$) of the switched-capacitor conversion circuit 10, and N is a positive integer. With the switching operations of the switches 101 to 104, the switched-capacitor conversion circuit 10 can convert the input voltage $V_{IN}$ into the intermediate voltage $V_{UNREG}$ on the output terminal T10.

Please refer to FIG. 2, the input terminal T11 of the inductor buck circuit 11 is connected to the output terminal T10 of the switched-capacitor conversion circuit 10, so that the inductor buck circuit 11 and the switched-capacitor conversion circuit 10 are connected in series. The inductor buck circuit 11 includes an input capacitor 110, a high-side switch 111, a low-side switch 112, an inductor 113, and an output capacitor 114. The input capacitor 110 is coupled between the input terminal T11 and ground GND, and can be charged by the intermediate voltage $V_{UNREG}$. The high-side switch 111 is coupled between the input terminal T11 and the node N12. The low-side switch 112 is coupled between the node N12 and the ground GND. The inductor 113 is coupled between the node N12 and the conversion output terminal T12. The output capacitor 114 is coupled between the conversion output terminal T12 and the ground GND. The high-side switch 111 is controlled by the switching signal HS_ON, to switch between the turn-on state and turn-off state. In detail, when an enable pulse occurs on the switching signal HS_ON, that is, the switching signal HS_ON is at high level, the high-side switch 111 is turned on. The low-side switch 112 is controlled by the switching signal LS_ON, to switch between the turn on state and the turn off state. In this embodiment, the switching signals HS_ON and LS_ON are generated by the internal circuit of the inductor buck circuit 11. The turn-on period of the high-side switch 111 and the turn-on period of the low-side switch 112 do not overlap with each other. In an embodiment, the switching signals HS_ON and LS_ON have the same frequencies, but the phases of the switching signals HS_ON and LS_ON are reverse to each other. The high-side switch 111 and the low-side switch 112 are not turned on at the same time. In this embodiment, the switching frequency $f_{SW\_BUCK}$ of the high-side switch 111 and the low-side switch 112 is equal to the frequency $f_{HS\_ON}$ of the switching signal HS_ON. With the switching operations of the high-side switch 111 and the low-side switch 112, the inductor buck circuit 11 can generate the output voltage $V_{OUT}$ at the conversion output terminal T12, according to the intermediate voltage $V_{UNREG}$.

Figure 3A:
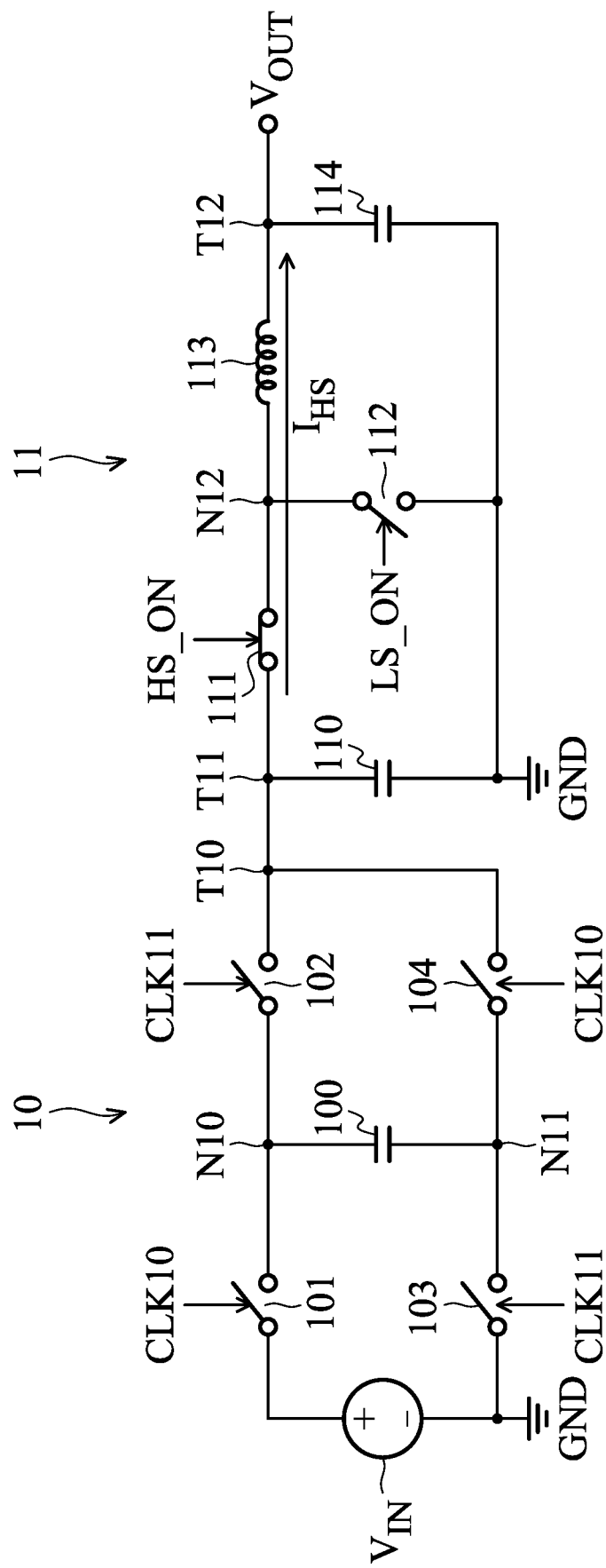
FIG. 3A is a schematic view of an inductor buck circuit being operated in a soft-charging mode according to an embodiment of the present invention.

According to the turn on/off states of the high-side switch 111 and the low-side switch 112, the inductor buck circuit 11 can be operated in two modes, to generate the output voltage $V_{OUT}$. Please refer to FIG. 3A. When the high-side switch 111 is turned on according to the switching signal HS_ON and the low-side switch 112 is turned off according to the switching signal LS_ON, the inductor buck circuit 11 enters a soft-charging mode. In the soft-charging mode, the inductor 113 and the capacitor 100 are connected in series, and generate the current $I_{HS}$, which is drawn from the input capacitor 110 and flows through the input terminal T11, the high-side switch 111 and the inductor 113. Since the inductor current must be continuous, the inductor 113 can be regarded as a constant current load connected to the capacitor 100 in series in the soft-charging mode.

Figure 3B:
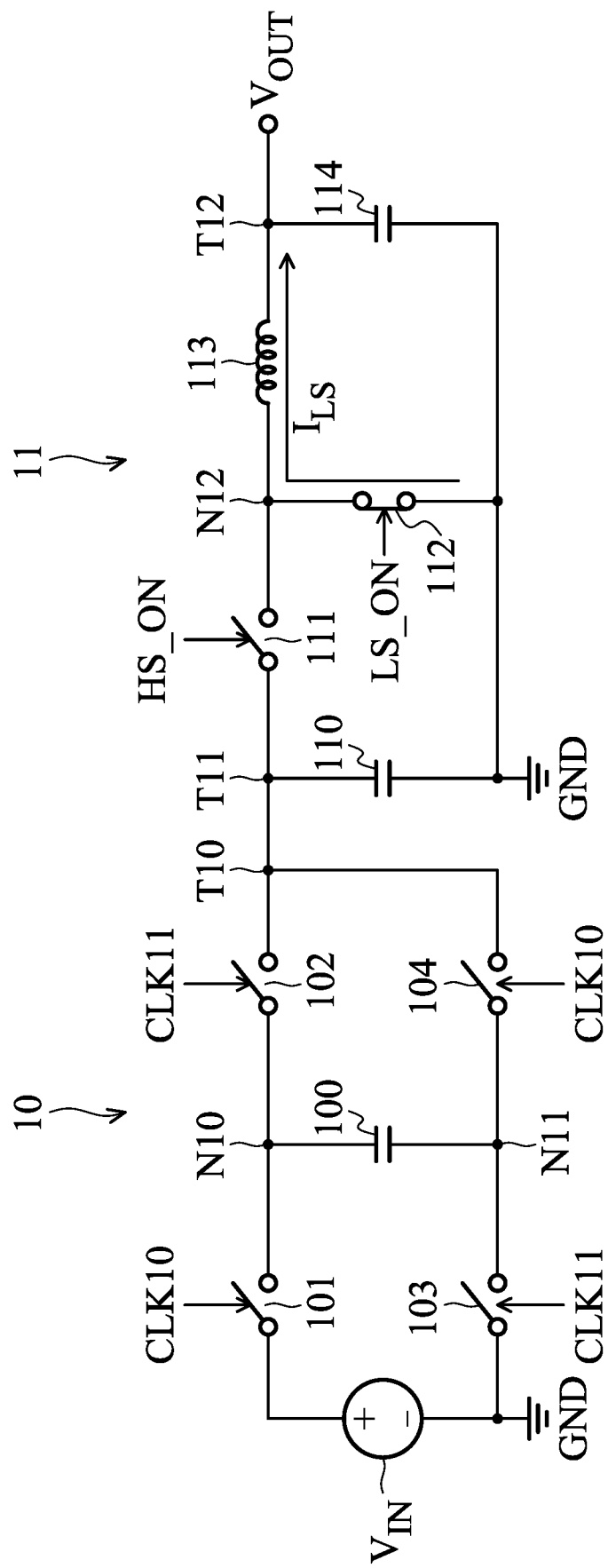
FIG. 3B is a schematic view of, an inductor buck circuit being operated in a hard-charging mode according to an embodiment of the present invention.
Figure 4:
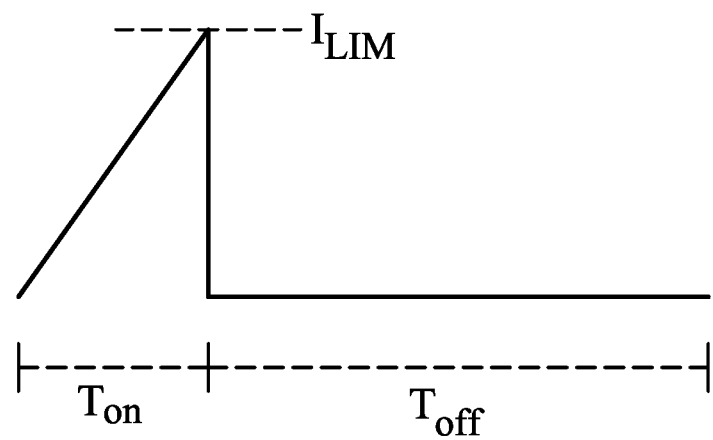
FIG. 4 is a diagram showing an input current of an inductor buck circuit according to an embodiment of the present invention.

Please refer to FIG. 3B. When the high-side switch 111 is turned off according to the switching signal HS_ON and the low-side switch 112 is turned on according to the switching signal LS_ON, the inductor buck circuit 11 enters a hard-charging mode. In the hard-charging mode, a current $I_{LS}$ flowing through the low-side switch 112 and the inductor 113 is generated. Please refer to FIG. 4, which shows the input current of the inductor buck circuit 11. As shown in FIG. 4, the soft-charging mode period, in which the high-side switch 111 is turned on, is labelled as Ton; the hard-charging mode period, in which the high-side switch 111 is turned off, is labelled as Toff. As shown in FIG. 4, during the soft-charging mode period Ton the input current of the inductor buck circuit 11 is gradually increased from an initial value. When the input current reaches an upper current limit value $I_{LIM}$, the high-side switch 111 is turned off; at this time, the inductor buck circuit 11 enters the hard-charging mode period Toff, and the input current is decreased to the initial value.

According to aforementioned circuit architecture and operation, the inductor buck circuit 11 is connected to the output terminal T10 of the switched-capacitor conversion circuit 10 in series, the input current of the inductor buck circuit 11 is a load current of the switched-capacitor conversion circuit 10. An average load current $I_{O1,AVG}$ of the switched-capacitor conversion circuit 10 can be expressed as an equation (1):

$$I_{O1,AVG} = \frac{0.5 I_{LIM} t_{on}}{T_{on} + T_{off}} = 0.5 I_{LIM} \left( \frac{L \cdot I_{LIM}}{V_{UNREG} - V_{OUT}} \right) f_{SW\_BUCK} \quad (1)$$

In the equation (1), L is an inductance value of the inductor 113. Furthermore, for convenience in explanation, in the equation (1) and following equations, each symbol is a voltage, current, period or frequency of the corresponding device, other than the particular symbol. For example, in the equation (1), $I_{O1,AVG}$ is the average load current, and $V_{UNREG}$ is the intermediate voltage.

The equivalent output impedance $R_{OUT}$ of the switched-capacitor conversion circuit 10 can be expressed by an equation (2).

$$R_{OUT} = \sqrt{R_{SSL}^2 + R_{FSL}^2} \quad (2)$$

Figure 5A:
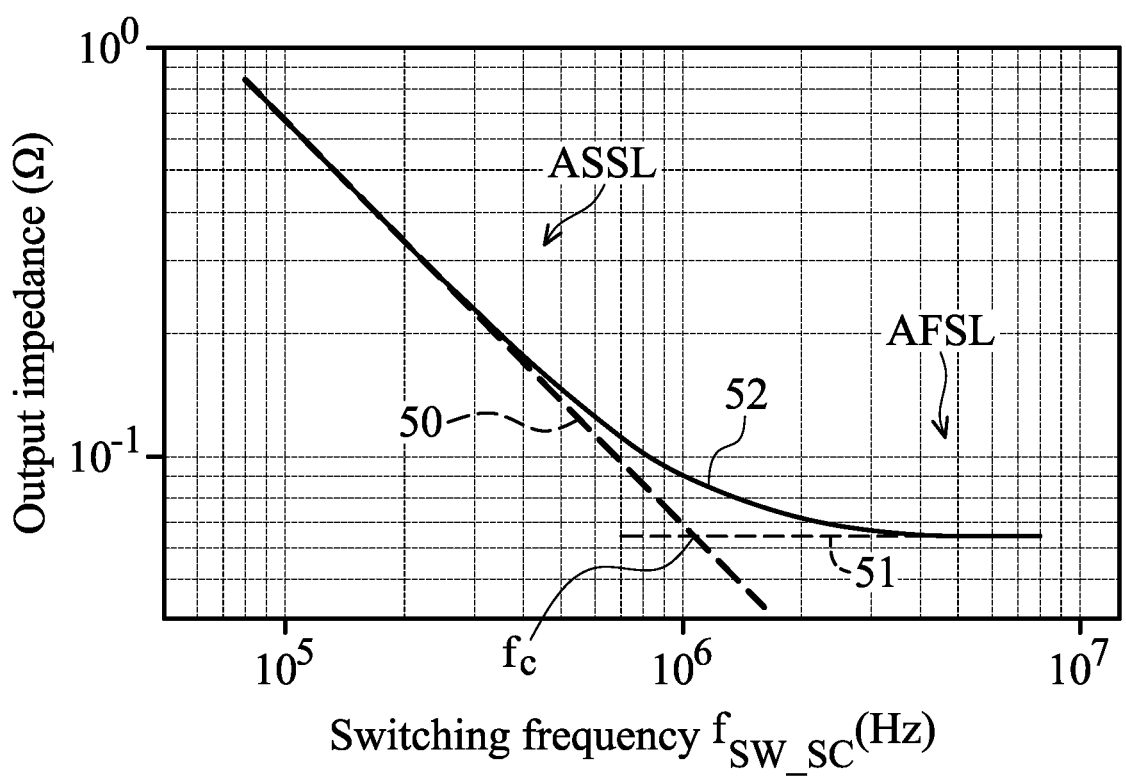
FIG. 5A is a diagram showing a relationship between a switching frequency and an output impedance of a switched-capacitor conversion circuit according to an embodiment of the present invention.

Please refer to FIG. 5A, which is a schematic diagram showing a relationship between the switching frequency $f_{SW\_SC}$ and the output impedance of the switched-capacitor conversion circuit 10. As shown in FIG. 5A, a curve 50 is a curve showing a relationship between the switching frequency $f_{SW\_SC}$ and the output impedance under a slow switching limit, and a curve 51 is a curve showing a relationship between the switching frequency $f_{SW\_SC}$ and the output impedance under a fast switching limit, and a curve 52 is an asymptote approaching the curves 50 and 51. In the equation (2), $R_{SSL}$ is an asymptotic value of the output impedance under SSL, and $R_{FSL}$ is an asymptotic value of the output impedance under FSL.

Please refer to FIG. 5A, in a low-frequency region ASSL, the output impedance is decreased along with the increasing of the switching frequency $f_{SW\_SC}$; in a high-frequency region AFSL, the output impedance is kept as a constant value. As described above, in the soft-charging mode, the inductor 113 can be regarded as a certain current load, so the output impedance in the low-frequency region ASSL can be significantly reduced. However, when the soft-charging mode cannot be implemented fully, slight frequency dependence still exist. The output impedance $R_{SSL}$ can be expressed by an equation (3).

$$R_{SSL} = \frac{\alpha K_c}{f_{SW\_SC} C_{FLY}} \quad (3)$$

In the equation (3), α is a soft-charging index in the low-frequency region ASSL, Kc is a constant. When α is equal to 1, the equation (3) also can express the output impedance RSSL in the hard-charging mode.

Figure 5B:
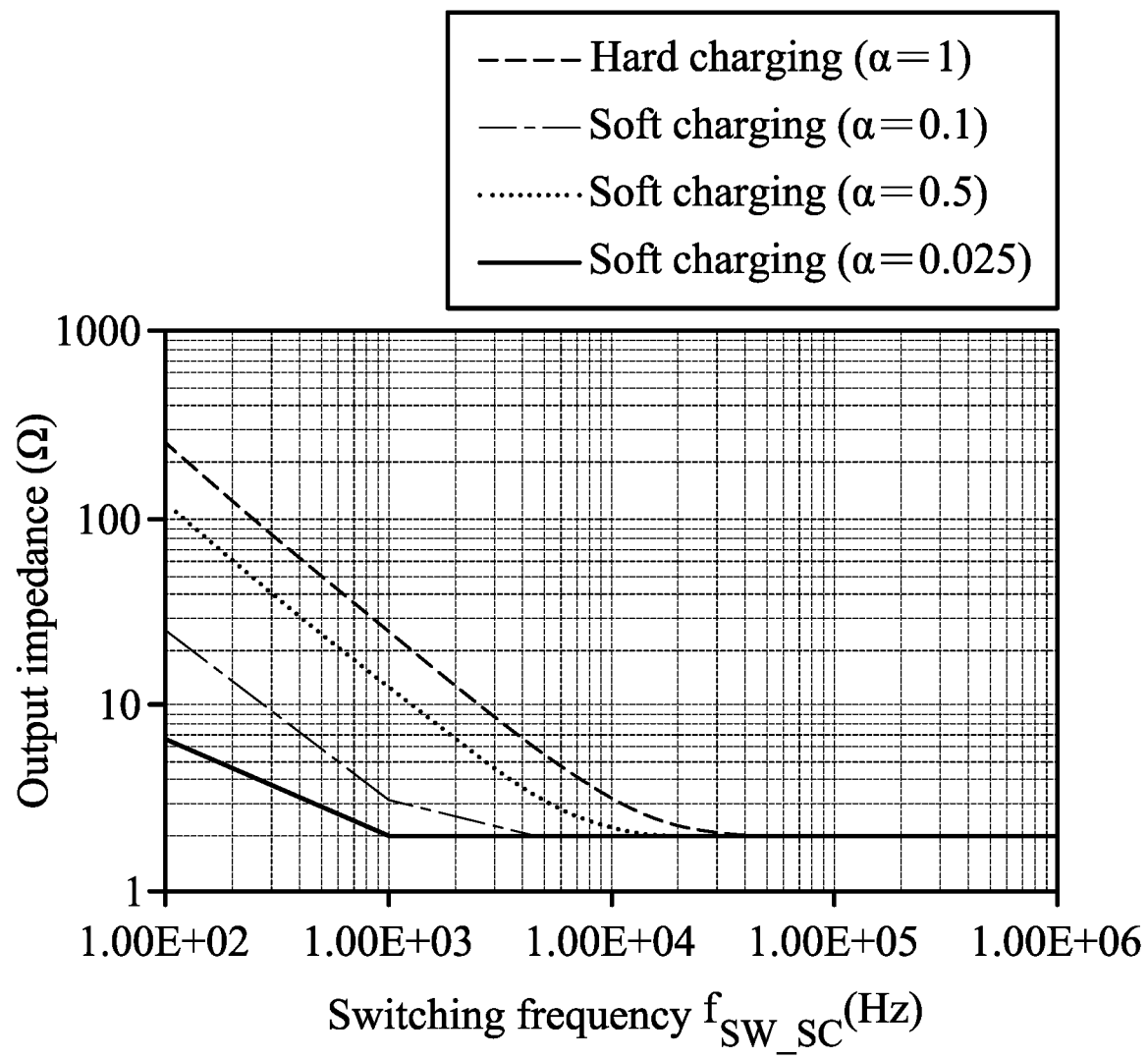
FIG. 5B is a diagram showing a relationship between a switching frequency and an output impedance of a switched-capacitor conversion circuit with different soft-charging indexes a, according to an embodiment of the present invention.

Please refer to FIG. 5B, which is a diagram showing a relationship between the switching frequency $f_{SW\_SC}$ and output impedance of the switched-capacitor conversion circuit 10 with different values a. As shown in FIG. 5B, the output impedance $R_{SSL}$ is decreased along with decreasing of the value a, but the minimum value of the output impedance $R_{SSL}$ still is determined by the output impedance $R_{SFL}$. The equation (2) can be changed to following equation:

$$R_{OUT} = \sqrt{R_{SSL}^2 + R_{FSL}^2} = \sqrt{2} R_{SSL} \quad (4)$$

According to the equation (3), the output impedance $R_{SSL}$ is inversely proportional to the switching frequency $f_{SW\_SC}$ of the switched-capacitor conversion circuit 10 and the capacitance value $C_{FLY}$ of the capacitor 100. According to the equations (3) and (4), the switching frequency $f_{SW\_SC}$ can be expressed by an equation (5):

$$f_{SW\_SC} = \frac{\alpha K_c}{R_{SSL} C_{FLY}} = \frac{\sqrt{2}\, \alpha K_c}{R_{OUT} C_{FLY}} = \frac{\sqrt{2}\, \alpha K_c}{\left( \frac{NV_{IN} - V_{UNREG}}{I_{O1,REG}} \right) C_{FLY}} \quad (5)$$

The equation (1) can be substituted into the equation (5), to obtain the optimized switching frequency $f_{SW\_SC}$, which can be expressed as an equation (6):

$$f_{SW\_SC} = \frac{\alpha K_c L I_{LIM}^2 f_{SW\_BUCK}}{\sqrt{2}\, (NV_{IN} - V_{UNREG})(V_{UNREG} - V_{OUT}) C_{FLY}} \propto \frac{f_{SW\_BUCK}}{V_{UNREG} - V_{OUT}} \quad (6)$$

Figure 6:
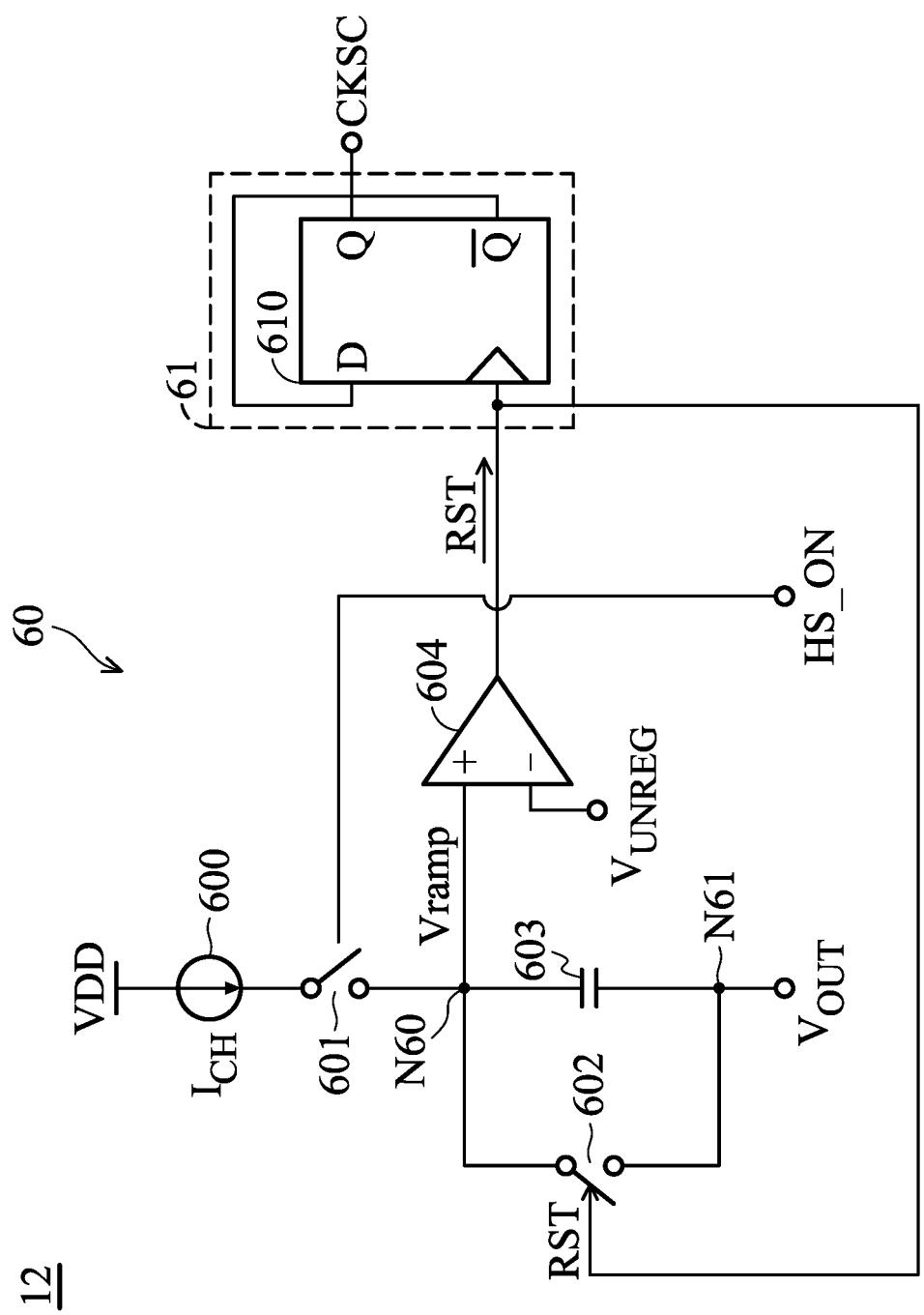
FIG. 6 show a block diagram of a clock generation circuit according to an embodiment of the present invention.

According to the equation (6), the switching frequency $f_{SW\_SC}$ of the switched-capacitor conversion circuit 10 is proportional to the switching frequency $f_{SW\_BUCK}$ of the inductor buck circuit 11, and inversely proportional to a voltage difference ($V_{UNREG} - V_{OUT}$) cross the inductor 113. According to an embodiment of the present invention, the optimized switching frequency $f_{SW\_SC}$ can be implemented by the clock generation circuit 12. Please refer to FIG. 6, which shows a block diagram of the clock generation circuit 12 according to an embodiment of the present invention. As shown in FIG. 6, the clock generation circuit 12 receives the intermediate signal $V_{UNREG}$, the switching signal HS_ON, the output voltage $V_{OUT}$, a frequency detection circuit 60 and a frequency divider circuit 61. The frequency detection circuit 60 includes a current source 600, switches 601 and 602, a capacitor 603, and a comparator 604. The current source 600 is coupled to an operating voltage VDD of the power converter 1, and configured to provide a charging current $I_{CH}$. The switch 601 is coupled between the current source 600 and the node N60, and is controlled by the switching signal HS_ON. The capacitor 603 is coupled between the node N60 and N61. The frequency detection circuit 60 receives the output voltage $V_{OUT}$ through the node N61. The switch 602 is coupled between the node N60 and N61. The comparator 604 has a positive input coupled to the node N60, and a negative input receiving the intermediate voltage $V_{UNREG}$. The comparator 604 can execute a comparison operation, and generate a detection signal RST on the output terminal according to the comparison result. In this embodiment, the frequency divider 61 is implemented by a ½ frequency divider. Please refer to FIG. 6, the frequency divider 61 includes a D-Flip-Flop 610. The D-Flip-Flop 610 has an input terminal D connected to an inverting output terminal $\overline{Q}$ thereof, a clock terminal CK receiving the detection signal RST, and an output terminal Q generating the clock signal CKSC. The clock signal CKSC is inverse to the signal on the inverting output terminal $\overline{Q}$.

As shown in FIG. 6, the switch 601 is controlled by the switching signal HS_ON. In detail, when an enable pulse (high level) occurs on the switching signal HS_ON, the switch 601 is turned on, and the capacitor 603 is charged by the charging current $I_{CH}$ of the current source 600. A ramp voltage Vramp on the node N60 is gradually risen because of the voltage level of the output voltage $V_{OUT}$. When the switch 602 is turned on, the capacitor 603 is discharged, so the ramp voltage Vramp is reset to the voltage level of the output voltage $V_{OUT}$. The comparator 604 compares the ramp voltage Vramp and the intermediate voltage $V_{UNREG}$. When the ramp voltage Vramp is lower than the intermediate voltage $V_{UNREG}$, the detection signal RST is set as a low level; when the ramp voltage Vramp is higher than the intermediate voltage $V_{UNREG}$, the detection signal RST is changed to the high level. According to the charging operation of the capacitor 603, when the frequency of the switching signal HS_ON is higher, the ramp voltage Vramp is risen faster, so that the detection signal RST can be changed to high level from the low level in a short time interval. The frequency of the detection signal RST is associated with the frequency of the switching signal HS_ON; more particularly, the frequency of the detection signal RST is proportional to the frequency of the switching signal HS_ON. According to above contents, the frequency detection circuit 60 can be operated to detect the frequency of the switching signal HS_ON, and generate the detection signal RST indicative of the frequency of the switching signal HS_ON. Furthermore, when the detection signal RST is at the high level, the switch 602 is turned on, so as to reset the ramp voltage Vramp to be the voltage level of the output voltage $V_{OUT}$. With the operation of the D-Flip-Flop 610, the frequency $f_{CKSC}$ of the generated clock signal CKSC is equal to a half of the frequency of the detection signal RST.

According to aforementioned operation of the frequency detection circuit 60, when the frequency $f_{HS\_ON}$ of the switching signal HS_ON is higher, the rising and falling speeds of the ramp voltage Vramp are faster, so that the frequency of the detection signal RST switching between the high level and the low level is higher. In this condition, the frequency $f_{CKSC}$ of the clock CKSC generated by the frequency divider circuit 61 is higher, and the switching frequency $f_{SW\_SC}$ also becomes higher. Furthermore, as described above, the switching frequency $f_{SW\_BUCK}$ of the inductor buck circuit 11 is equal to the frequency $f_{HS\_ON}$ of the switching signal HS_ON. The operation of the clock generation circuit 12 can implement that the switching frequency $f_{SW\_SC}$ is proportional to the switching frequency $f_{SW\_BUCK}$ of the inductor buck circuit 11, as expressed in the equation (6).

Furthermore, when the switch 602 is turned on by the detection signal RST, the ramp voltage Vramp is reset to the voltage level of the output voltage $V_{OUT}$; next, when the switch 601 is turned on, the ramp voltage Vramp is gradually risen from the voltage level of the output voltage $V_{OUT}$. When the voltage difference ($V_{UNREG}$-$V_{OUT}$) between the intermediate voltage $V_{UNREG}$ and the output voltage $V_{OUT}$ is lower, the comparator 604 can enable the detection signal RST in a shorter time after the ramp voltage Vramp is reset, the frequency $f_{CSKC}$ of the clock signal CKSC becomes higher, and the switching frequency $f_{SW\_SC}$ is also higher. The operation of the clock generation circuit 12 can implement that the switching frequency $f_{SW\_SC}$ is inversely proportional to the voltage difference ($V_{UNREG}$-$V_{OUT}$), as expressed by the equation (6).

According to the circuit architecture and operation of the clock generation circuit 12, the frequency $f_{CSKC}$ of the clock signal CKSC can be expressed by an equation (7):

$$f_{CKSC} = \frac{f_{RST}}{2} = \frac{I_{CH}}{2C_T(V_{UNREG} - V_{OUT})} \propto \frac{f_{SW\_BUCK}}{V_{UNREG} - V_{OUT}} \quad (7)$$

According to the equation (7), the frequency $f_{CSKC}$ of the clock signal CKSC is affected by a size of the charging current ICH. Please refer to FIG. 2. According to the circuit characteristic of the switched-capacitor conversion circuit 10, when the switching frequency $f_{SW\_SC}$ reduces, the surge voltage of the intermediate voltage $V_{UNREG}$ becomes higher; otherwise, the surge voltage of the intermediate voltage $V_{UNREG}$ becomes lower. Furthermore, as shown in FIG. 6, when the charging current $I_{CH}$ is higher, the comparator 604 can enable the detection signal RST in a shorter time after the ramp voltage Vramp is reset, the frequency $f_{CSKC}$ of the clock signal CKSC becomes higher, and the switching frequency $f_{SW\_SC}$ is also higher. In an embodiment of the present invention, the size of the charging current $I_{CH}$ is proportional to the input voltage $V_{IN}$. Under a condition that the inductor buck circuit 11 is formed by low voltage devices/components, when the input voltage $V_{IN}$ is higher, the clock generation circuit 12 can be operated to increase the frequency $f_{CSKC}$, so as to decrease the surge voltage of the intermediate voltage $V_{UNREG}$ generated by the switched-capacitor conversion circuit 10, thereby preventing the devices/components of the inductor buck circuit 11 from being damaged.

According to an embodiment of the present invention, the inductor buck circuit 11 is formed by low voltage devices. In order to prevent the intermediate voltage $V_{UNREG}$ generated by the switched-capacitor conversion circuit 10 from being excessive (that is, the input voltage $V_{IN}$ is too high) to damage the device/component of the inductor buck circuit 11, the intermediate voltage $V_{UNREG}$ must be lower than a maximal value $V_{IN\_BUCK,max}$. As shown in FIG. 2, a surge voltage $\Delta V$ of the switched-capacitor conversion circuit 10 can be expressed by an equation (8).

$$\Delta V = \frac{I_{O1,AVG}}{C_{int} f_{SW\_SC}} \quad (8)$$

In the equation (8), $C_{int}$ is a capacitance value of the capacitor 110.

The maximal value $V_{IN\_BUCK,max}$ can be expressed by an equation (9).

$$V_{UNREG} = \frac{\Delta V}{2} < V_{IN_{BUCK},max} \quad (9)$$

According to the equations (8) and (9), the minimum value of the switching frequency $f_{SW\_SC}$ of the switched-capacitor conversion circuit 10 can be determined by an equation (10):

$$f_{SW\_SC} > \frac{I_{O1,AVG}}{2C_{int}(V_{IN_{BUCK},max} - V_{UNREG})} \quad (10)$$

In the equation (10), $$\frac{I_{O1,AVG}}{2C_{int}(V_{IN_{BUCK},max} - V_{UNREG})}$$

is the minimal threshold of the switching frequency $f_{SW\_SC}$. According to the equation (10), in order to prevent the intermediate voltage $V_{UNREG}$ generated by the switched-capacitor conversion circuit 10 from exceeding the maximal value $V_{IN\_BUCK,max}$, the minimum value of the switching frequency $f_{SW\_SC}$ must be increased along with the increasing of the intermediate voltage $V_{UNREG}$, In other words, the minimum value of the switching frequency $f_{SW\_SC}$ is determined by the intermediate voltage $V_{UNREG}$. The intermediate voltage $V_{UNREG}$ is proportional to the input voltage $V_{IN}$, so that the minimum value of the switching frequency $f_{SW\_SC}$ must be increased along with the increasing of the input voltage $V_{IN}$. In an embodiment of the present invention, the charging current $I_{CH}$ of the inductor buck circuit 11 can be set to be directly proportional to the input voltage $V_{IN}$, that is, the charging current $I_{CH}$ is directly proportional to the intermediate voltage $V_{UNREG}$, so as to determine the minimum value of the switching frequency $f_{SW\_SC}$.

According to above-mentioned embodiment, the switching frequency $f_{SW\_SC}$ of the switched-capacitor conversion circuit 10 is determined by the switching frequency $f_{HS\_ON}$ of the inductor buck circuit 11, and the switching frequency $f_{SW\_SC}$ is higher than the minimal threshold. In this embodiment, the minimal threshold is determined by the intermediate voltage $V_{UNREG}$; for example, the minimal threshold is proportional to the intermediate voltage $V_{UNREG}$. Determining the switching frequency $f_{SW\_SC}$ upon the switching frequency $f_{HS\_ON}$ to limit the minimum value of the switching frequency $f_{SW\_SC}$, the switching frequency $f_{SW\_SC}$ can be optimized, so as to protect the devices or components of the inductor buck circuit 11 from being damage by the excessive input voltage $V_{IN}$.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A power converter, comprising:
a switched-capacitor conversion circuit configured to receive an input voltage, and operate, according to a first switching frequency, to convert the input voltage into an intermediate voltage; and
an inductor buck circuit connected in series to the switched-capacitor conversion circuit, and configured to receive the intermediate voltage and generate an output voltage on a conversion output terminal according to the intermediate voltage,
wherein the first switching frequency is higher than a minimal threshold, and the minimal threshold is directly proportional to the intermediate voltage,
wherein the switched-capacitor conversion circuit is configured to operate according to a first switching signal having the first switching frequency, and the inductor buck circuit comprises a high-side switch and an inductor connected in series between the switched-capacitor conversion circuit and the conversion output terminal, and the high-side switch is controlled by a second switching signal having a second switching frequency,
wherein the power converter comprises a clock generator configured to receive the second switching signal and generate a clock signal, and
wherein a frequency of the clock signal is determined by the second switching frequency, and a frequency of the first switching signal is directly proportional to the frequency of the clock signal.

2. The power converter according to claim 1, wherein the frequency of the clock signal is directly proportional to the second switching frequency.

3. The power converter according to claim 1, wherein the clock generator comprises:
a frequency detection circuit configured to receive the second switching signal, and detect the second switching frequency of the second switching signal to generate a detection signal; and
a frequency divider circuit configured to receive the detection signal, and generate the clock signal according to the detection signal.

4. The power converter according to claim 3, wherein the frequency of the clock signal is a half of a frequency of the detection signal.

5. The power converter according to claim 3, wherein the frequency detection circuit comprises:
a current source configured to provide a charging current;
a first switch coupled between the current source and a first node, and controlled by the second switching signal;
a capacitor coupled between the first node and a second node, wherein a ramp voltage is generated at the first node, and the frequency detection circuit receives the output voltage through the second node;
a second switch coupled between the first node and the second node; and
a comparator having a positive input coupled to the first node, and a negative input receiving the intermediate voltage, and configured to compare the ramp voltage and the intermediate voltage, to generate the detection signal,
wherein a size of the charging current is proportional to the input voltage, and the second switch is controlled by the detection signal.

6. The power converter according to claim 3, wherein the frequency divider circuit comprises:
a D-Flip-Flop having an input terminal, a clock terminal receiving the detection signal, an output terminal generating the clock signal, and an inverting output terminal.

7. The power converter according to claim 1, wherein the switched-capacitor conversion circuit comprises a plurality of first switches and a plurality of second switches, the plurality of first switches and the plurality of second switches are switched with the first switching frequency, and a turn-on period of the plurality of first switches and a turn-on period of the plurality of second switches do not overlap with each other.

8. The power converter according to claim 1, wherein an input terminal of the inductor buck circuit receives the intermediate voltage, and the inductor buck circuit further comprises:
an input capacitor coupled between the input terminal of the inductor buck circuit and ground, wherein the high-side switch coupled between the input terminal of the inductor buck circuit and a first node;
a low-side switch coupled between the first node and the ground, wherein inductor coupled between the first node and the conversion output terminal; and an output capacitor coupled between the conversion output terminal and the ground,
wherein a turn-on period of the high-side switch and a turn-on period of the low-side switch do not overlap with each other.

* * * * *